United States Patent

Murai et al.

[11] Patent Number: 6,022,147
[45] Date of Patent: Feb. 8, 2000

[54] ROLLER BEARING WITH A CAGE

[75] Inventors: Takashi Murai, Kanagawa-ken; Osamu Fujii, Yokohama; Michitsugu Mori, Chigasaki, all of Japan

[73] Assignee: NSK Ltd., Tokyo, Japan

[21] Appl. No.: 09/166,547

[22] Filed: Oct. 5, 1998

[51] Int. Cl.[7] .................................................. F16C 33/52
[52] U.S. Cl. ............................................ 384/574; 384/579
[58] Field of Search ................................. 384/572, 574, 384/578, 579, 567

[56] References Cited

U.S. PATENT DOCUMENTS

| 796,200 | 8/1905 | Fox | 384/579 |
| 2,017,186 | 10/1935 | Rockwell | 384/574 X |
| 2,130,258 | 9/1938 | Baker et al. | 384/579 |
| 4,099,803 | 7/1978 | Knappe . | |

FOREIGN PATENT DOCUMENTS 49-37730  10/1974  Japan .
63-193119 12/1988  Japan .

*Primary Examiner*—Thomas R. Hannon
*Attorney, Agent, or Firm*—Vorys, Sater, Seymour and Pease LLP

[57] ABSTRACT

A roller bearing with a cage comprises an inner race and an outer race concentric with each other, a plurality of rollers interposed between the inner race and the outer race, and a cage for retaining these rollers. The cage comprises a pair of annular side plates disposed at the both ends of each of the rollers for supporting the rollers to be rotatable, and a plurality of pins each having its both ends respectively connected to connection portions of the pair of annular side plates. The parallel screw portions are respectively formed at the both ends of each of the pins and large-diameter portions each having a larger diameter than the parallel screw portions are respectively formed on the inner sides of the parallel screw portions on the both sides thereof. The circular recesses in which the large-diameter portions are respectively fitted are respectively formed on the inner sides of the pin connection portions of the pair of annular side plates.

3 Claims, 9 Drawing Sheets

ROLLER BEARING WITH A CAGE

This application claims the benefit of Japanese Patent Application No. 9-287627, and a Japanese Patent Application (No. not yet assigned, attorney's docket No. 98NSP057) filed Sep. 10, 1998 which are hereby incorporated by reference.

BACKGROUND OF THE INVENTION

1. Field of the Invention

The present invention relates to a roller bearing with a cage on which a large load or an impact load is to be imposed, and more specifically, to a technology to facilitate the assembly or to enhance the durability thereof.

2. Related Background Art

A roller bearing with a cage is frequently used for supporting a gear shaft, a spindle, rollers, etc., since in a reduction apparatus for a rolling mill, a pinion stand, a crusher, or the like, a large load or an impact load is caused to act on each of the constituent parts and, moreover, the apparatus itself vibrates severely. With such roller bearing with a cage, rollers are supported by a pin-type cage or a stud-type cage so that a friction or damage of rollers and the main body of the case caused by the mutual contact is not brought about, and the rollers can be securely retained.

A roller bearing with a pin-type cage is a bearing for retaining rollers by means of a pin-type cage which comprises a plurality of pins and a pair of annular side plates for supporting the rollers to be rotatable. Such roller bearing is described in Japanese Utility Model Publication No. 49-37730, et al., and a structure in which such pin-type cage is applied to a conical roller bearing is shown in FIGS. 10 and 11.

In a pin-type cage 13 of a bearing 1 shown in FIG. 10, pins 11 and an annular side plate 17 are connected with each other by use of parallel screws, while the pins 11 and an annular side plate 15 are connected with each other by means of welding. More specifically, parallel screw portions 71 are formed at the fore ends of the pins 11, and after these parallel screw portions 71 are inserted into through holes 73 which are formed on the annular side plate 17, nuts 75 are screwed onto the parallel screw portions 71, whereby the pins 11 and the annular side plate 17 are connected with each other. On the other hand, flange portions 77 are formed at the hind ends of the pins 11. After these flange portions 77 are fitted in recesses 79 formed on the outer side surface of the annular side plate 15, a weld is carried out to connect the pins 11 with the annular side plate 15. It should be noted that when the pin-type cage 13 is to be assembled, the pins 11 and the annular side plate 17 are connected with each other after the pins 11 are inserted through rollers 7.

Also, in a pin-type cage 13 of a bearing 1 shown in FIG. 11, a pin 11 and an annular side plate 15 are connected with each other by means of welding. On the other hand, the pin 11 and an annular side plate 17 are connected with each other by means of a cone screw. More specifically, a cone screw portion 81 is formed at the fore end of the pin 11, and this cone screw portion 81 is screwed into a cone screw hole 83 which is formed on the annular side plate 17, whereby the pin 11 and the annular side plate 17 are connected with each other.

On the other hand, a roller bearing with a stud-type cage is a bearing for retaining rollers by means of a cage which comprises a plurality of stud pins and stay-type pins and a pair of annular side plates. This roller bearing is described in U.S. Pat. No. 4099803, et al., and a structure in which such stud-type cage is applied to a cylindrical roller bearing is shown in FIG. 12.

In a stud-type cage of a bearing 1 shown in FIG. 12, a stay 55 and two annular side plates 15 and 17 are connected with each other by press fitting or welding, meanwhile cylindrical rollers 7 are retained to be rotatable by stud pins 85 which are press fitted in the inner surface sides of the both annular side plates 15 and 17.

There exist various demands for the above-mentioned roller bearing with a cage, in order to enhance the assembling performance or improve the strength of the bearing, or the like.

For example, in the pin-type cage shown in FIG. 10, which uses the parallel screws for connecting the pins 11 and the annular side plate 17, a jig is required for adjusting a space between the both annular side plates 15 and 17, and moreover, close attention much to be paid when each nut 75 is fastened, which results in a very poor assembling performance. On the other hand, with respect to the pin-type cage shown in FIG. 11 which uses the cone screws, if a manufacturing error of a referential diameter of the cone screw is great, the axial position of the pin 11 with respect to the annular side plate 17 becomes hardly constant, so that the cone screw portion 81 may extrude inside the annular side plate 17, as shown in FIG. 13. In this case, a stress is concentrated on a trough of the cone screw portion 81 so that the strength of the pin 11 is decreased and the pin 11 may be broken or damaged due to its long use under severe use conditions. In addition, also in the roller bearing with the stud-type cage shown in FIG. 12 in which a pin-type stay 55 is press fitted into the two annular side plates 15 and 17 and welded together, a jig is required for adjusting a space between the both annular side plates 15 and 17. Moreover, if a space between the both annular side plates 15 and 17 is too narrow, the adjustment thereof is difficult, which results in a problem of a very poor production yield.

The pin 11 (or the stay-type pin 55) and the annular side plate 17 (or the annular side plates 15 and 17) are connected together by means of welding, as shown in FIG. 14 (showing the essential part of the roller bearing with the pin-type cage of FIG. 11). However, it is difficult to evaluate the quality of the welding part itself at a low cost, and there is another problem that some limitation may be placed on the hardening treatment or the like of the pin 11. That is, though it is desirable that the pin 11 and the stay-type pin 55 be subjected to carburization or quenching treatment to enhance the hardness thereof, it is difficult to conduct such treatment on the entire body of the pin 11 or the stay-type pin 55 in order to prevent cracks in welding. As a result, it is difficult to reduce a frictional abrasion caused by the contact with a roller 13 or enhance the strength of the pin 11 or the stay-type pin 55 itself in a part in which a range for conducting the hardening treatment is restricted so that a desired hardness can not be obtained.

On the other hand, about a half of a load which is applied onto the pin 11 from the roller 13 is caused to act on a contact portion with the annular side plate 15. However, in the above-mentioned conventional roller bearing, the flange portion 77 is positioned outside of the annular side plate 15 so that the length of action becomes large. As a result, a stress generated in the welding portion becomes great, which is disadvantageous for the purpose of enhancing this strength of the portion.

SUMMARY OF THE INVENTION

The present invention was conceived taking the above circumstances into consideration and an object of the invention is to provide a roller bearing with a cage which can facilitate the assembly or enhancing the durability of the bearing.

In order to achieve the above object, according to the present invention, there is provided a roller bearing with a cage comprising:

an inner race and an outer race concentric with each other;

a plurality of rollers interposed between the inner race and the outer race; and a cage for retaining these rollers, characterized in that:

the cage comprises a pair of annular side plates disposed at the both ends of the rollers for supporting the rollers to be rotatable, and a plurality of pins each having its both ends respectively connected to connection portions of the pair of annular side plates;

parallel screw portions are respectively formed at the both ends of each pin and large-diameter portions each having a larger diameter than the parallel screw portions are respectively formed on the inner sides of the parallel screw portions on the both sides thereof; and circular recesses in which said large-diameter portions are respectively fitted are respectively formed on the inner sides of the pin connection portions of the pair of annular side plates.

According to the present invention, a space between the two annular side plates is determined by the positions of the large-diameter portions in the pins and the depth of the recesses on the annular side plates, so that the determined value can be constant and appropriate only by maintaining the dimensional precision of these parts. In addition, since the ends of the pins and the two annular side plates are both fastened by the parallel screws, it becomes possible to conduct a hardening treatment of the pins without considering a crack or the like which may be caused by the weld. Furthermore, since the large-diameter portions are located on the inner sides of the parallel screw portions, the length of action of a load to be applied on the pins is shortened so as to enhance the strength of the pins.

DESCRIPTION OF THE PREFERRED EMBODIMENTS

Preferred embodiments of the present invention will be described in detail with reference to the drawings.

Figure 1:
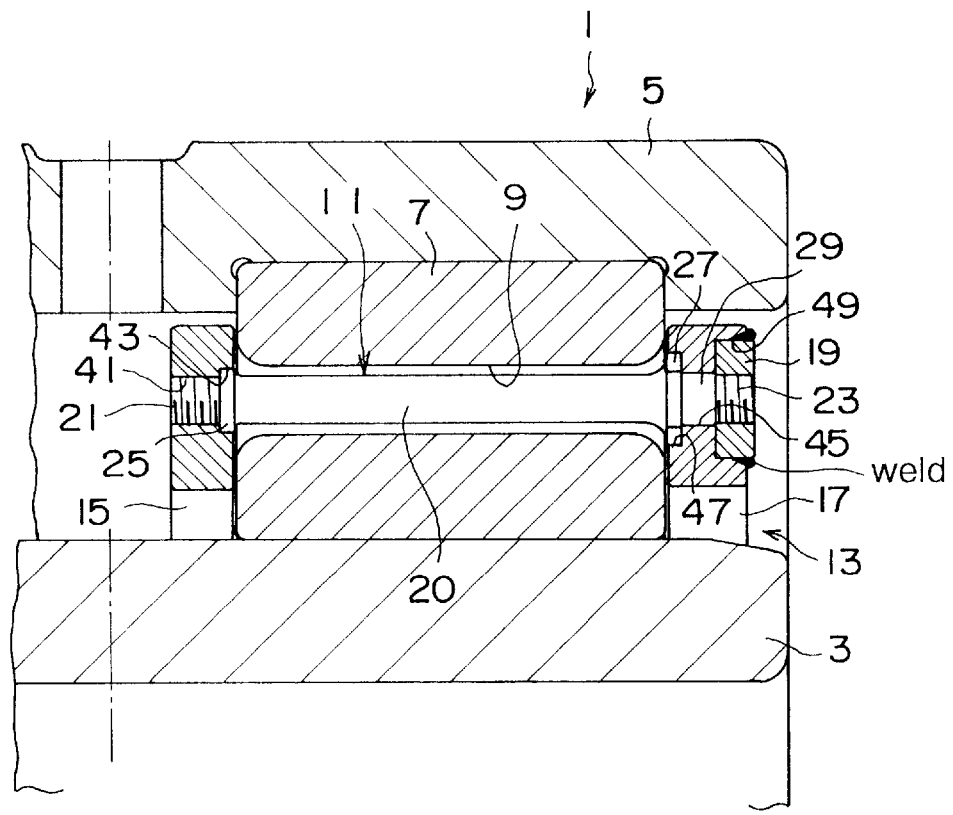
FIG. 1 is a longitudinally cut-away cross-sectional view for showing the essential part of a roller bearing with a pin-type cage according to a first embodiment of the present invention.

FIG. 1 shows the essential part of a roller bearing with a pin-type cage according to a first embodiment of the present invention, seen from a longitudinally cut-away cross section thereof. The bearing 1 in this embodiment is a so-called double-row cylindrical roller bearing, in which cylindrical rollers 7 are provided in two rows between an inner race 3 and an outer race 5. Each of the cylindrical rollers 7 is retained to be rotatable by a pin-type cage 13 provided with pins 11 which are fitted with play in the respective through holes 9 each formed at the axial center of the roller 7, while each roller maintaining a predetermined space with an adjacent cylindrical roller 7.

Figure 2:
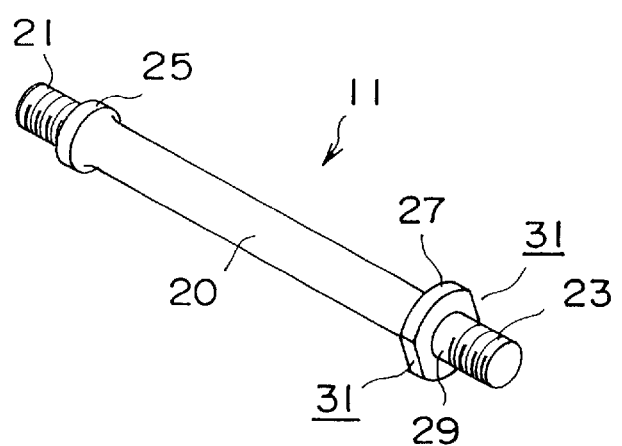
FIG. 2 is a perspective view of a pin according to the first embodiment.

The pin-type cage 13 of the present embodiment is comprised of a first annular side plate 15, a second annular side plate 17, and nuts 19 (ring nuts in the present embodiment), in addition to the pins 11. The pins 11, each is formed with first and second parallel screw portions 21 and 23 having the same screw diameter at the both ends of a pin section 20, and first and second flange portions 25 and 27 which are the large-diameter portions are formed respectively on the inner sides of these first and second parallel screw portions 21 and 23. The first flange portion 25 has a smaller diameter than the second flange portion 27 so as to pass through the through hole 9 of the cylindrical roller. On the other hand, a straight portion 29 is formed between the second parallel screw portion 23 and the second flange portion 27. In addition, as shown in FIG. 2 (a perspective view of the pin 11), a pair of parallel portions 31 which are facing each other are formed on the outer periphery of the second flange portion 27.

The first annular side plate 15 is formed with first screw holes 41 each of which is threadably engaged with the first parallel screw portion 21 of the pin 11, and the first annular side plate 15 is formed also with a first circular recess 43 on the inner side of each first screw hole 41 in which the first flange portion 25 is fitted. The second annular side plate 17 is formed with parallel holes 45 in each of which the straight portion 29 of the pin 11 is fitted and the second annualar side plate 17 is formed on the inner side thereof with second circular recesses 47 in each of which the second flange portion 27 is fitted, and further on the outer side with third circular recesses 49 in each of which the nut 19 is fitted.

Description will be made on an assembling steps of the bearing in the first embodiment, and a mode of operation thereof.

In order to assemble the bearing 1 of the first embodiment, the assembling worker first disposes the cylindrical rollers 7 and the first annular side plate 15 on the side of the outer race 5, inserts the pins 11 into the respective through holes 9 of the cylindrical rollers 7 from the outside, places a wrench or the like on the parallel portion 31 to screw the first parallel screw portion 21 into the first screw hole 41 with a predetermined torque. In this manner, the first annular side plate 15 and the pins 11 are fastened together and the first flange portions 25 are fitted in the respective first circular recesses 43.

Next, the assembling worker positions the second annular side plate 17 and puts it as it is over the pins 11, and after inserting the straight portion 29 of each pin 11 into the parallel hole portion 45, screws the nut 19 into the second parallel screw portion 23 with a predetermined fastening torque by means of a pin wrench, or the like. In this manner, upon completion of the assembly of the cylindrical rollers 7 and the pin-type cage 13, the second flange portion 27 are fitted in the respective second circular recesses 47. After that, the assembling worker welds the nuts 19 to the second annular side plate 17, thereby stopping the loosening thereof.

In the bearing 1 of the first embodiment, a space between the two annular side plates 15 and 17 is determined by a space between the first and second flange portions 25 and 27 and the depth of the first and second circular recesses 43 and 47. For this reason, the spaces between the two annular side plates 15 and 17 and the cylindrical roller 7 are made constant and appropriate by maintaining the precision of these dimensions, and no extra movement (backlash) of the cylindrical rollers 7 in the axial direction does not occur. Also, when a large load or an impact load is caused to act on the pin 11 through the cylindrical roller 7, such load is transmitted to the first and second annular side plates 15 and 17 through the first and second flange portions 25 and 27 having relatively large diameter. For this reason, the pin 11 is hardly broken or damaged at the parallel screw portions 21 and 23, and has a far higher load performance, compared with that in the above-mentioned conventional bearing. Also, each pin 11 has no part to be welded, so that the hardness of the entire pin can be enhanced by carrying out the carburization or quenching treatment, whereby frictional abrasion or the like caused by contact with the cylindrical roller 7 can be suppressed to the minimum.

Figure 3:
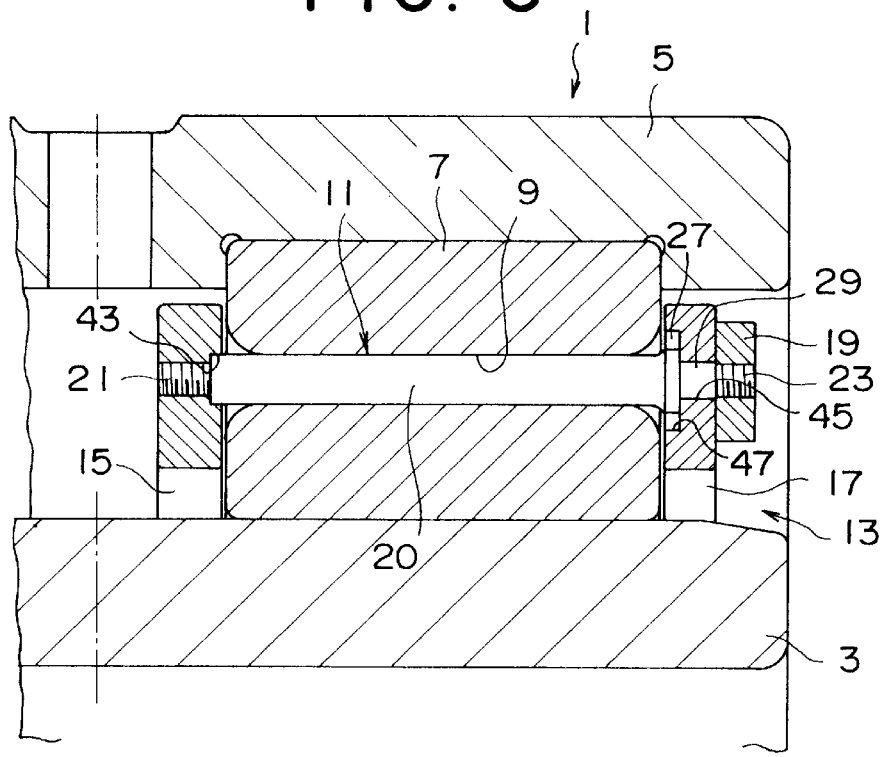
FIG. 3 is a longitudinally cut-away cross-sectional view for showing the essential part of a roller bearing with a pin-type cage according to a second embodiment of the present invention.

FIG. 3 shows the essential part of a roller bearing with a pin-type cage according to a second embodiment, seen from a longitudinally cut-away cross section. Like the first embodiment, the second embodiment provides a structure in which the present invention is applied to a double-row cylindrical roller bearing. Since the structure of a pin-type cage 13 of the second embodiment is almost the same as that of the first embodiment, a difference between two embodiments will be described.

Also in the second embodiment, first and second parallel screw portions 21 and 23 are formed at the both ends of each pin 11. However, the outer diameter of the first parallel screw portion 21 is substantially set to be smaller than that of a pin section 20, and a flange portion on the inner side of the first parallel screw portion 21 which appears in the first embodiment is omitted. That is, in the present embodiment, the pin section 20 serves also as a large-diameter portion on the side of the first parallel screw portion 21, and the end thereof is fitted in a first circular recess 43. A second annular side plate 17 is made to be thinner than that of the first embodiment, and there is no circular recess in which a nut 19 is fitted on the outer side of the parallel hole section 45. It should be noted that in the present embodiment any nut other than a ring nut, i.e., a hexagon nut or a square nut, or the like, can be used as the nut 19.

Description will be made on an assembling steps of the bearing in the second embodiment, and a mode of operation thereof.

In order to assemble the bearing 1 in the second embodiment, the assembling worker first disposes the cylindrical rollers 7 and the first annular side plate 15 on the side of the outer race 5, inserts the pins 11 into the respective through holes 9 of the cylindrical rollers 7 from the outside, places a wrench or the like on the parallel portion 31 to screw the first parallel screw portion 21 into the first screw hole 41 with a predetermined torque. In this manner, the first annular side plate 15 and the pins 11 are fastened together and the pin section 20 is fitted in the first circular recess 43.

Next, the assembling worker positions the second annular side plate 17 and puts it as it is over the pins 11, and after inserting the straight portion 29 of the pin 11 into the parallel hole portion 45, screws the nut 19 into the second parallel screw portion 23 with a predetermined torque by means of a socket wrench, or the like. In this manner, upon completion of the assembly of the cylindrical rollers 7 and the pin-type cage 13, the second flange portions 27 are fitted in the respective second circular recesses 47. It should be noted that welding between the second annular side plate 17 each nut 19 is not carried out in the present embodiment, however, this welding can be conducted if needed.

With the bearing 1 of the second embodiment, the same operations and effects as those of the first embodiment can be rendered, except that the strength of the cylindrical rollers 7 or the pins 11 can be made higher than that of the first embodiment. That is, in the present embodiment, since no flange portion on the inner side of the first parallel screw portion 21 is provided, even if a space between the through hole 9 and the pin section 20 is reduced to the minimum, the pin 11 can be passed through the cylindrical roller 7, whereby it becomes possible to reduce the inner diameter of the through hole 9 or to enlarge the outer diameter of the pin section 20 for the purpose of enhancing the strength thereof.

Figure 4:
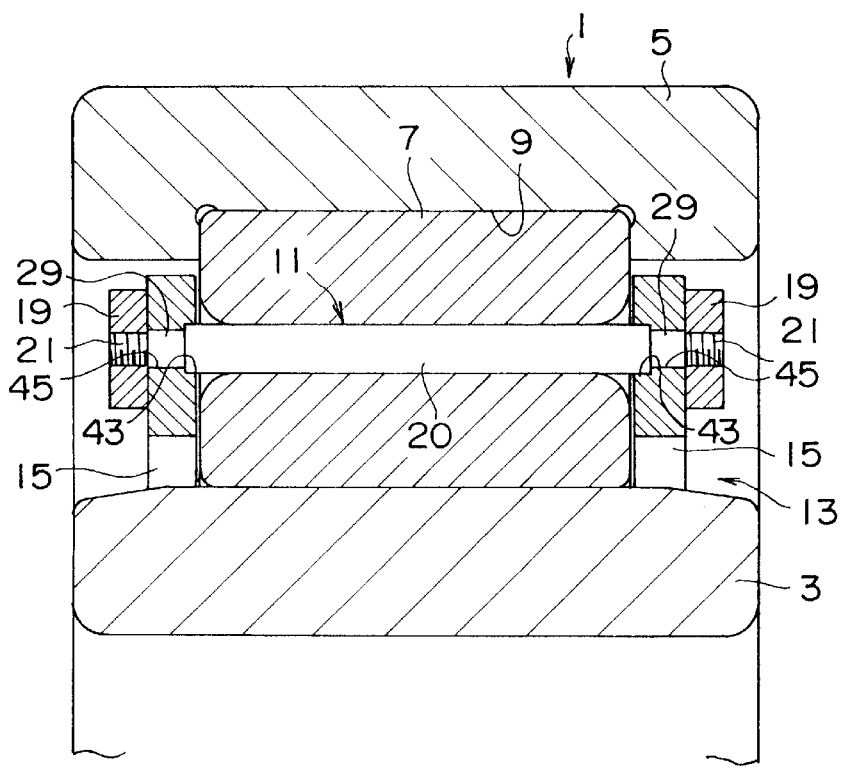
FIG. 4 is a longitudinally cut-away cross-sectional view for showing the essential part of a roller bearing with a pin-type cage according to a third embodiment of the present invention.

FIG. 4 shows the essential part of a roller bearing with a pin-type cage according to a third embodiment of the present invention, seen from a longitudinally cut-away cross section thereof. The third embodiment is different from the first and second embodiments in that the present invention is applied to a single-row cylindrical roller bearing. In this embodiment, a pin-type cage 13 has the entirely same arrangements at the both ends of each pin 11.

In the third embodiment, parallel screw portions 21 having the same diameter are formed at the both ends of the pin 11, and a straight portion 29 having a smaller diameter than a pin section 20 is formed on the inner side thereof. That is, in the present embodiment, each of the both ends of the pin 11 has a stepped portion and the both ends of the pin section 20 are fitted in the circular recesses 43 of the two annular side plates 15. Also, on the two annular side plates 15, like on the second annular side plate in the second embodiment, there is formed no circular recess in which a nut 19 is to be fitted on the outer side of a parallel hole portion 45.

Description will be made on an assembling steps of the bearing in the third embodiment, and a mode of operation thereof.

In order to assemble the bearing 1 of the third embodiment, the assembling worker first fastens the pins 11 to one of the annular side plates 15 with a predetermined torque by means of the nuts 19 to make them a sub-assembly, and then inserts the pin section 20 of each pin 11 into the through hole 9 of each cylindrical roller 7 provided on the side of the outer race 5. Next, the assembling worker positions the other of the annular side plates 15 and places it as it is over the pins 11, and after inserting the straight portion 29 of each pin 11 into the parallel hole portion 45, screws the nut 19 into the second parallel screw portion 23 with a predetermined torque by means of a socket wrench, or the like. In this manner, upon completion of the assembling of the cylindrical rollers 7 and the pin-type cage 13, the pin sections 20 are fitted in the circular recesses 43. It should be noted that welding between the second annular side plate 17 and the nuts 19 is not carried out also in the present embodiment, however this welding can be conducted if needed.

With the bearing 1 of the third embodiment, the same operations and effects as those of the second embodiment can be rendered, though the assembling process can be more facilitated. That is, it is possible to form one of the annular side plates 15 and the pins 11 as a sub-assembly in the present embodiment, so that if this sub-assembling step can be conducted by an automatic assembling machine or the like, the assembling work becomes far easier compared with that in the other embodiments. Also, the entire identical products are used as the annular side plate 15 and the nut 19, the number of the means for processing these products (a pressing stamp, a cutting tool, or the like) can be reduced and selection, stock control, etc., for the assembling work become very easy.

Figure 5:
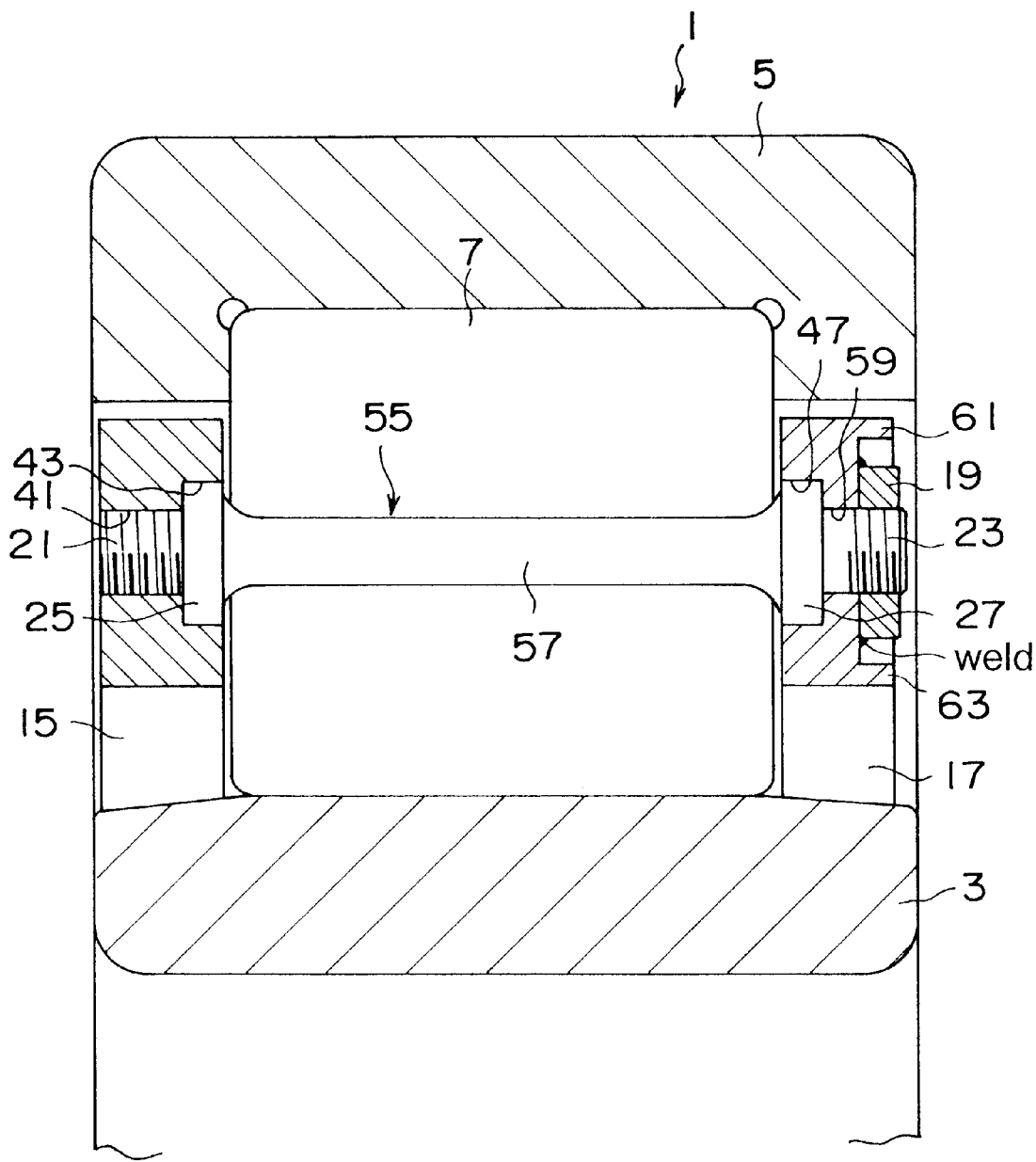
FIG. 5 is a longitudinally cut-away cross-sectional view for showing the essential part of a roller bearing with a stud-type cage according to a fourth embodiment of the present invention.
Figure 6:
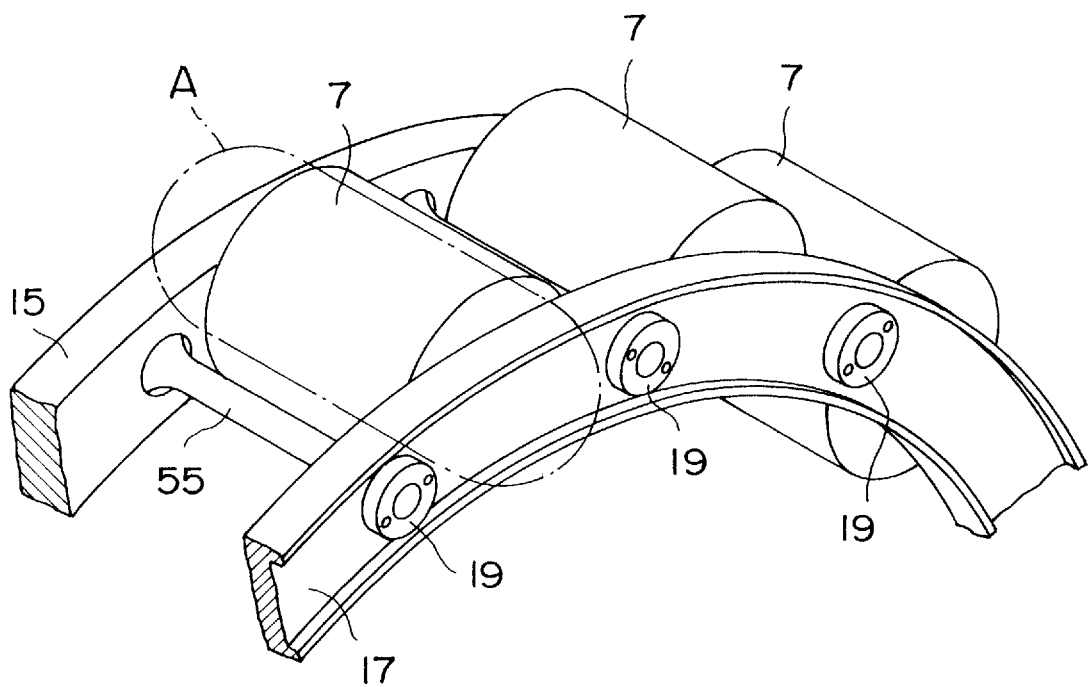
FIG. 6 is a perspective view for showing the essential part of the roller bearing with a stud-type cage according to the fourth embodiment, in a state with the inner and outer races removed.
Figure 7:
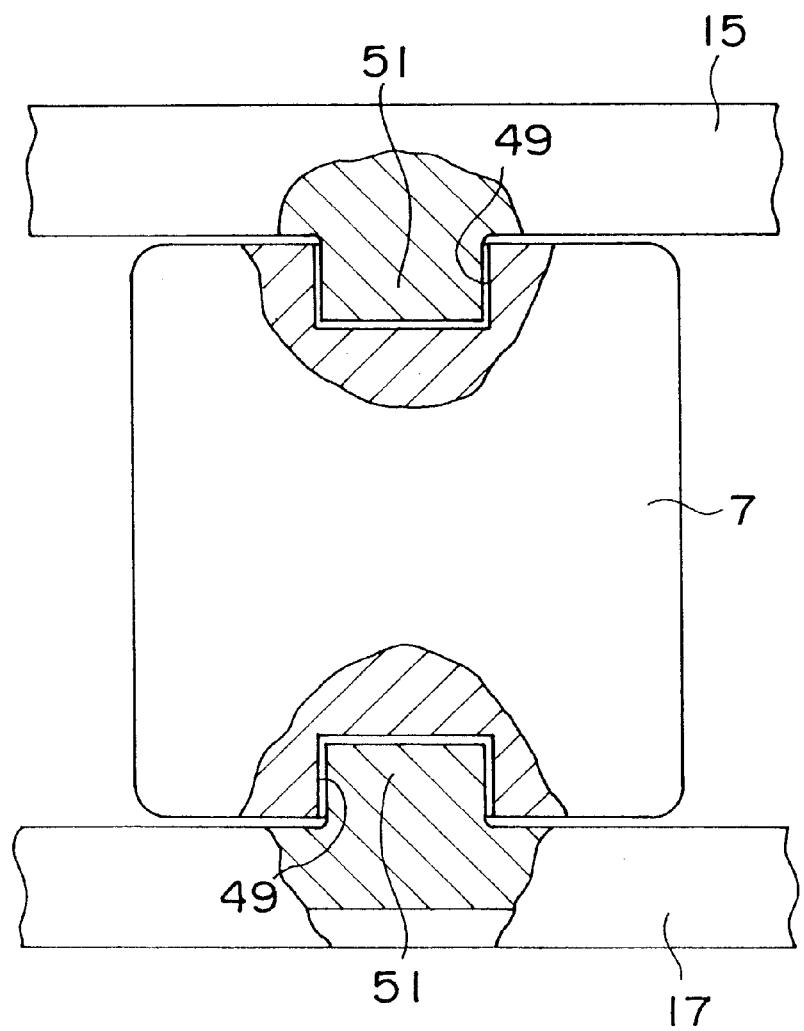
FIG. 7 is a laterally cross-sectional view of the part A in FIG. 6.

FIG. 5 shows the essential part of a roller bearing with a stud-type cage according to a fourth embodiment of the present invention, seen from the longitudinally cut-away cross section thereof, FIG. 6 is a perspective view of the same bearing with the inner and outer races removed, and FIG. 7 shows the part A in FIG. 6, seen from a lateral cross section thereof. The bearing 1 is a single-row cylindrical roller bearing in which cylindrical rollers 7 respectively having circular recesses 49 at the both ends thereof are provided between the inner race 3 and the outer race 5. Each of the cylindrical rollers 7 is supported to be rotatable by a stud-type cage 53 provided with studs 51 which are fitted with play in the respective circular recesses 49, while maintaining a predetermined space with an adjacent cylindrical roller 7.

The stud-type cage 53 of the present embodiment is comprised of pin-type stays 55 and nuts 19, as well as first and second annular side plates 15 and 17 with studs 51 respectively protruding from the inner sides thereof. In each stay-type pin 55, first and second parallel screw portions 21 and 23 having the same screw diameter are formed at the both ends of a shank portion 57, and first and second flange portions 25 and 27 respectively serving as the large-diameter portions are formed on the inner sides of these first and second parallel screw portions 21 and 23. In the present embodiment, the first flange portion 25 and the second flange portion 27 are formed to have the same diameter.

The first annular side plate 15 is formed with first screw holes 41 which are threadably engaged with the first parallel screw portions 21 of the stay-type pins 55, as well as first circular recesses 43 on the inner side thereof in which the first flange portions 25 are fitted. The second annular side plate 17 is provided with second circular recesses 47 in which second flange portions 27 of the stay-type pins 55 are fitted and parallel hole portions 59 through which the second parallel screw portions 23 are passed. On the outer side surface, the second annular side plate 17 is formed with outer peripheral flanges 61 and inner peripheral flanges 63 are formed to be protruding.

Description will be made on assembling steps of the bearing in the fourth embodiment, and a mode of operation thereof.

In order to assemble the bearing 1 of the fourth embodiment, the assembling worker first sets the outer race 5 and the first annular side plate 15 in an unrepresented jig, and then causes the studs 51 to be fitted in the circular recesses 49, thereby mounting each cylindrical roller 7 on a predetermined position on the first annular side plate 15. Next, the assembling worker rotates the second flange portion 27 by means of a wrench or the like to thereby screw the first parallel screw portion 21 of the stay-type pin 55 into the first screw hole 41 with a predetermined torque in such a manner that the first flange portion 25 is brought into tight contact with the bottom surface of the first circular recess 43.

Next, the assembling worker assembles the second annular side plate 17 at the position where the studs 51 are fitted in the circular recesses 49 of the cylindrical rollers 7 and, at the same time, the second parallel screw portions 23 of the stay-type pins 55 pass through the parallel hole sections 59. Next, the assembling worker screws the nuts 19 onto the respective second parallel screw portions 23 with a predetermined fastening torque by means of a pin wrench, whereby assembly of the cylindrical rollers 7 and the stud-type cage 53 is completed and the second flange portions 27 are fitted in the second circular recesses 47. After that, the assembling worker welds the nuts 19 to the second annular side plate 17, thereby stopping the loosening thereof.

In the bearing 1 of the fourth embodiment, like in the roller bearing with the pin-type cage of the first embodiment, a space between the two annular side plates 15 and 17 is determined by a space between the first and second flange portions 25 and 27 of the stay-type pin 55 and the depth of the first and second circular recesses 43 and 47 of the both annular side plates 15 and 17. For this reason, spaces between two both annular side plates 15 and 17 and the cylindrical rollers 7 are made constant and appropriate by maintaining the precision of these dimensions, and no extra movement (backlash) of the cylindrical rollers 7 in the axial direction does not occur. Also, the stay-type pins 55 each is formed with the first and second flange portions 25 and 27 on the inner sides of the first and second parallel screw portions 21 and 23, so that a moment load is caused to act on these first and second flange portions 25 and 27. As a result, it becomes possible to slenderize the shank portion 57 of the stay-type pin 55, thereby increasing the number of the rollers 7 or making the rollers solid by reducing a space for accommodating the stay-type pin 55. As a result, it becomes easier to increase a pressure-resisting crushing load of the cylindrical roller 7 itself. Further, the stay-type pin 55 has no part to be welded, so that the hardness of the entire pin can be enhanced by carrying out the carburization or the quenching treatment, thereby suppressing flexion or the like of the stud-type cage 53 to the minimum.

Figure 8:
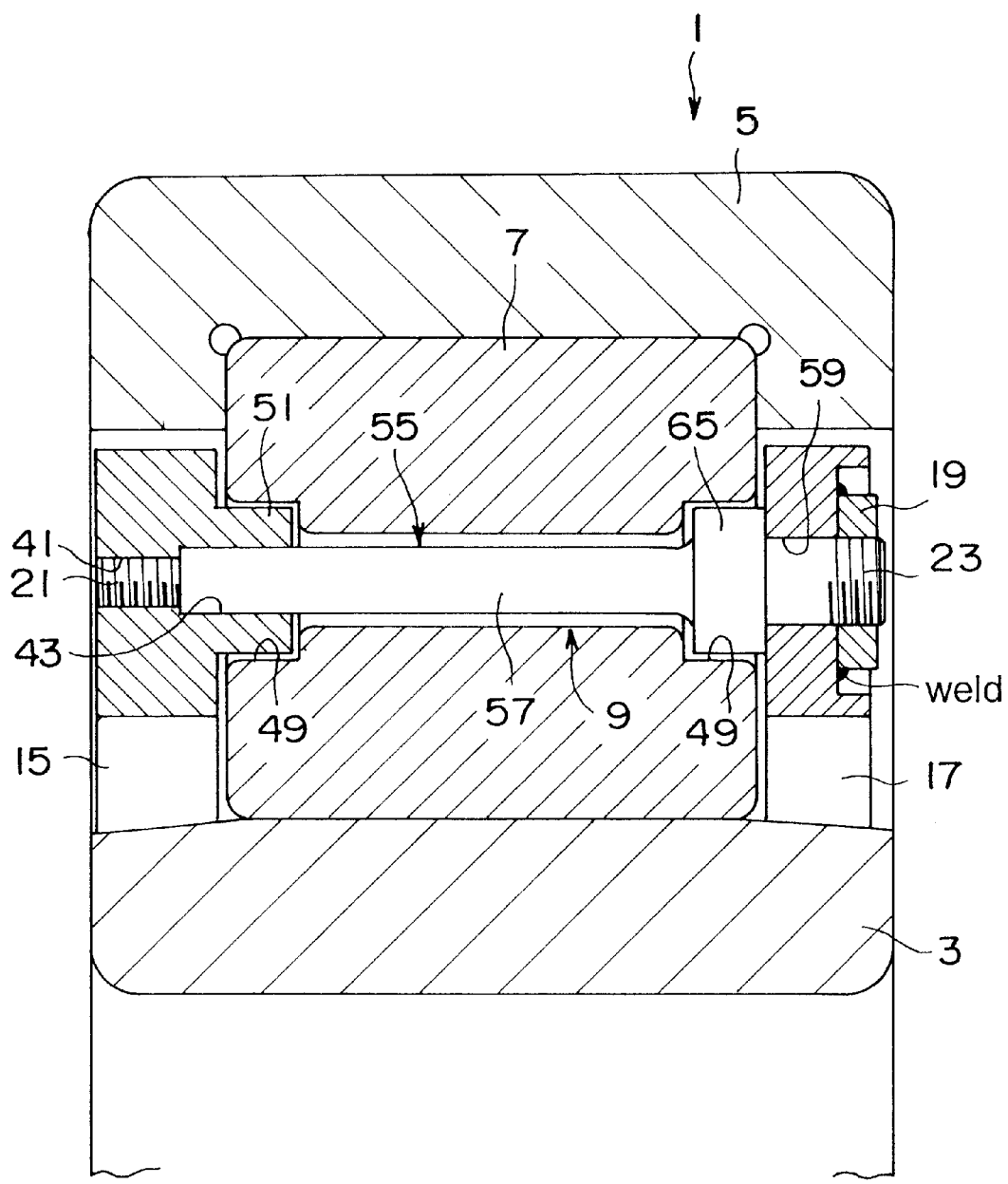
FIG. 8 is a longitudinally cut-away cross-sectional view for showing the essential part of a roller bearing with a stud-type cage according to a fifth embodiment of the present invention.

FIG. 8 shows the essential part of a roller bearing with a stud-type cage according to a fifth embodiment of the present invention, seen from a longitudinally cut-away cross section thereof. The bearing 1 in this embodiment is also a single-row cylindrical roller bearing, in which cylindrical rollers 7 each having circular recesses 49 at the both ends thereof are provided between an inner race 3 and an outer race 5. Each of the cylindrical rollers 7 is retained to be rotatable by a stud-type cage 53, which are provided with studs 51 fitted with play in the respective circular recesses 49 and with stud sections 65, while maintaining a predetermined space with an adjacent cylindrical roller 7.

The stud-type cage 53 is comprised of stay-type pins 55 which are fitted with play in through holes 9 each formed at the axial center of the cylindrical roller 7 and nuts 19, in addition to first and second annular side plates 15 and 17. In the present embodiment, three stay-type pins 55 are provided at equal intervals in the stud-type cage 53, and, in another area than that studs 51 which are similar to those of the fourth embodiment are provided to protrude from the inner side surfaces of the first and second annular side plates 15 and 17. The stay-type pins 55 each is formed with first and second parallel screw portions 21 and 23 at the both ends of a shank section 57. However, the outer diameter of the first parallel screw portion 21 is substantially set to be smaller than the outer diameter of the shank section 57. No flange portion is formed on the inner side of the first parallel screw portion 21, while a stud section 65 in the form of a cylinder is formed on the inner side of the second parallel screw portion 23.

In the positions where the stay-type pins 55 are located, the first annular side plate 15 is formed with first screw holes 41 each to be threadably engaged with the first parallel screw portion 21 of the stay-type pin 55 at the axial center of the stud 51, and is also formed with first circular recesses 43 in which the respective shank sections 57 are to be fitted, concentrically with the first screw holes 41. Also, the stud portion 65 of each stay-type pin 55 is brought into contact with the inner side surface of the second annular side plate 17 and, at the same time, a parallel hole portion 59 through which the second parallel screw portion 23 is passed is formed on the inner side surface of the second annular side plate 17.

Description will be made on assembling steps of the bearing in the fifth embodiment, and a mode of operation thereof.

In order to assemble the bearing 1 in the fifth embodiment, the assembling worker first sets the outer race 5 and the first annular side plate 15 in an unrepresented jig, and then fits the circular recesses 49 on the studs 51, thereby mounting the cylindrical rollers 7 on predetermined positions on the first annular side plate 15. Next, the assembling worker, after inserts and fits the stay-type pins 55 in the respective through holes 9 of the cylindrical roller 7, rotates each stud section 65 or the like by means of a wrench or the like to thereby screw the first parallel screw portion 21 of the stay-type pin into the first screw hole 41 with a predetermined torque in such a manner that the shank section 57 is brought into tight contact with the bottom surface of the first circular recess 43. In this manner, in the positions where the stay-type pins 55 are provided, the stud 51 and the stud section 65 are fitted in the circular recesses 49 at the both ends of the cylindrical roller 7 so that the cylindrical rollers 7 are retained by the first annular side plate 15 and the stay-type pins 55.

Next at positions other than that at which the stay-type pins 55 are located, that is, at positions where no stay-type pin is provided, the assembling worker inserts or fits the circular recesses 49 of the cylindrical rollers 7 onto the respective studs 51, and then assembles the second annular side plate 17 at positions where the second parallel screw portions 23 of the stay-type pin 55 pass through the parallel hole sections 59. Next, the assembling worker screws the nuts 19 onto the respective second parallel screw portions 23 with a predetermined fastening torque by means of a pin wrench, thereby bringing an end surface of each stud section 65 into tight contact with the second annular side plate 17 to complete assembling of the cylindrical rollers 7 and the stud-type cage 53. After that, the assembling worker welds the nuts 19 to the second annular side plate 17, thereby stopping the loosening thereof.

With the bearing 1 of the fifth embodiment, substantially the same operation and effects as those in the fourth embodiment can be rendered. However, in this embodiment, the stay-type pins 55 are accommodated through the cylindrical rollers 7 so that a space between the cylindrical rollers can be further shortened and the number of the cylindrical rollers 7 can be increased. Thus, it is possible to increase a load capacity of the bearing. Also, in compared with the roller bearing with the pin-type cage mentioned above, since the shank section 57 of the stay-type pin 55 is not contacted with the through hole 9 of the cylindrical roller 7, the shank section 57 can have a comparatively small diameter so as to maintain a space between the first annular side plate 15 and the second annular side plate 17 or to prevent a twist thereof. For this reason, the through hole 9 of the cylindrical roller 7 can also have a smaller diameter than that in the roller bearing with the pin-type cage, so that it becomes possible to increase a pressure-resisting crushing load of the cylindrical roller 7 itself.

Figure 9:
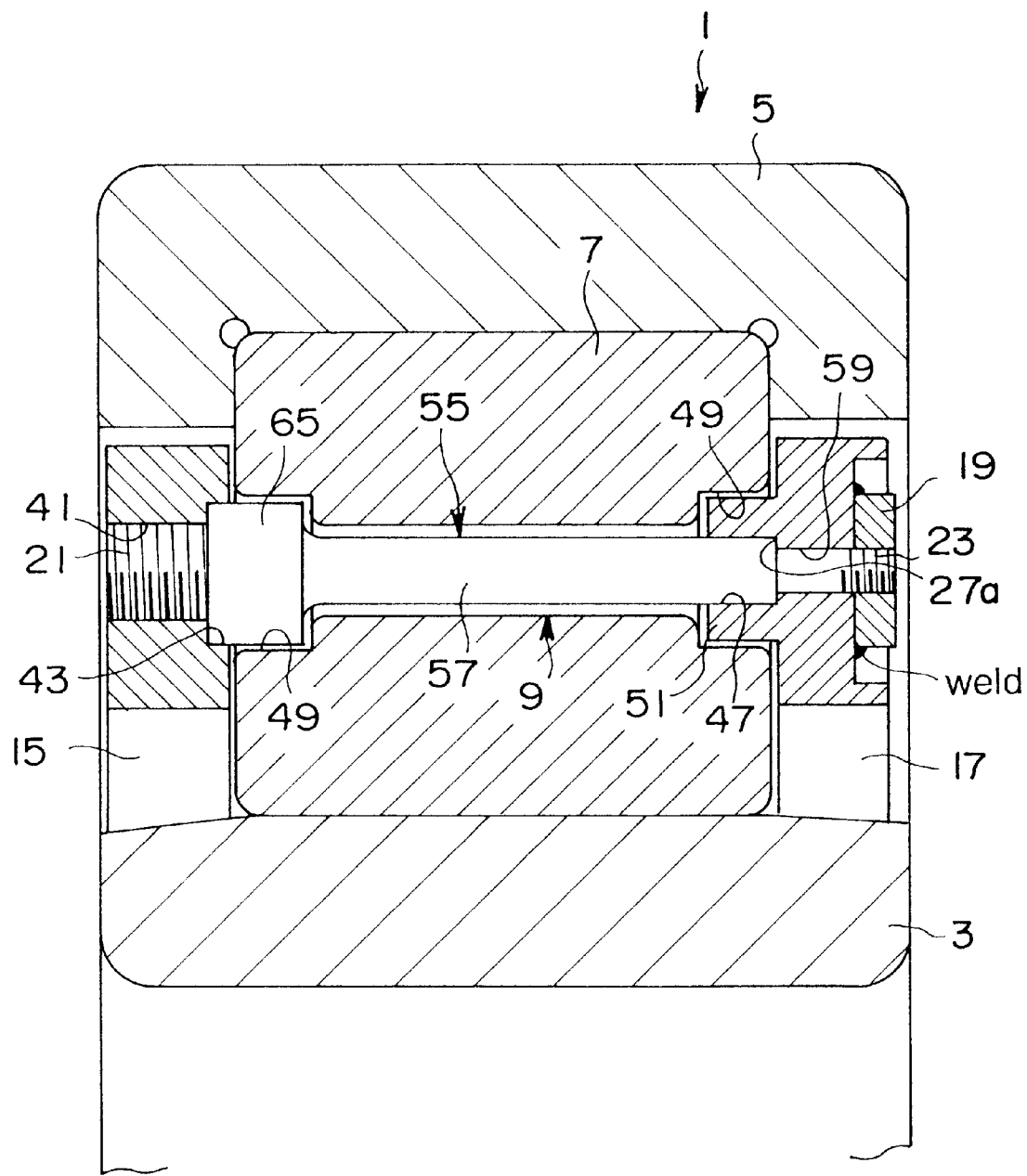
FIG. 9 is a longitudinally cut-away cross-sectional view for showing the essential part of a roller bearing with a stud-type cage according to a sixth embodiment of the present invention.
Figure 10:
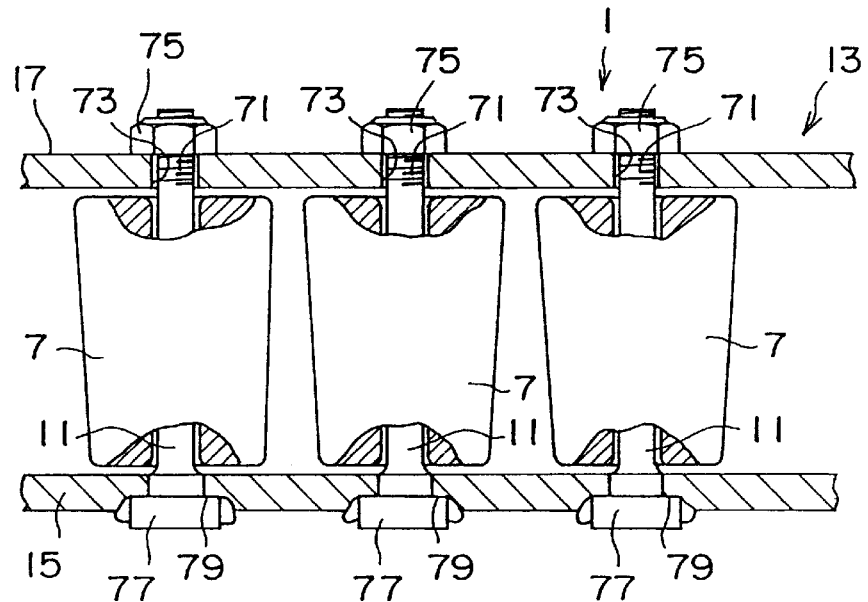
FIG. 10 is a longitudinally cross-sectional view for showing a conventional roller bearing with a pin-type cage.
Figure 11:
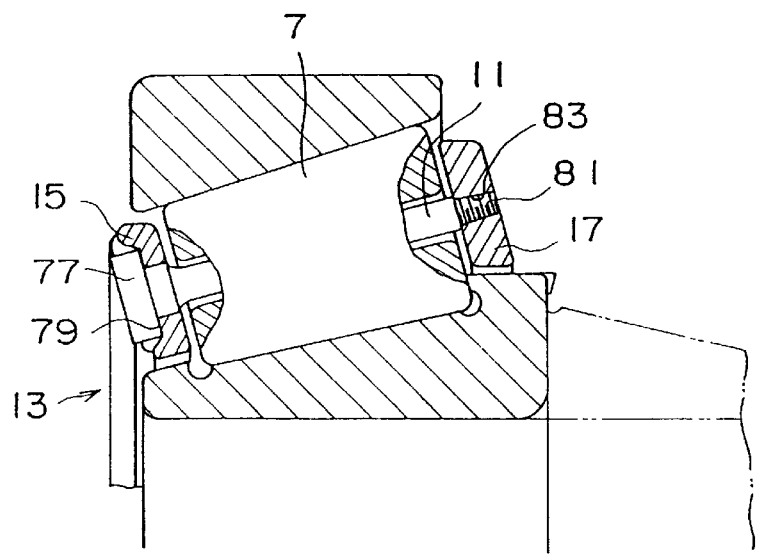
FIG. 11 is a longitudinally cross-sectional view for showing another conventional roller bearing with a pin-type cage.
Figure 12:
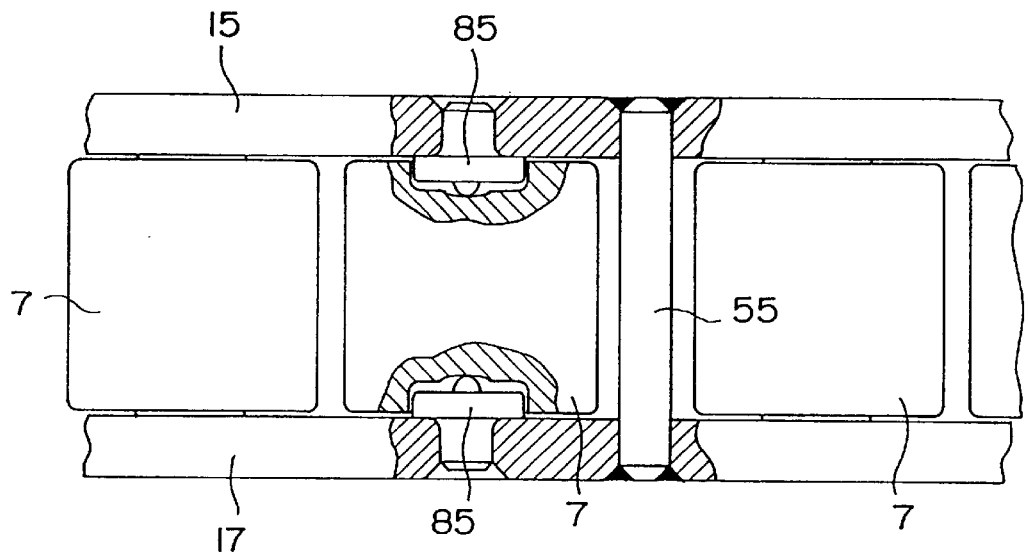
FIG. 12 is a view for illustrating a conventional roller bearing with a stud-type cage.
Figure 13:
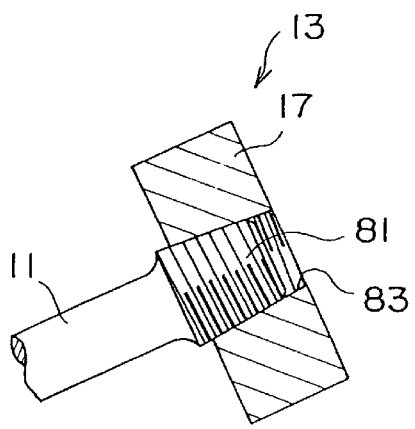
FIG. 13 is a view for illustrating the essential part of the roller bearing with a pin-type cage of FIG. 11.
Figure 14:
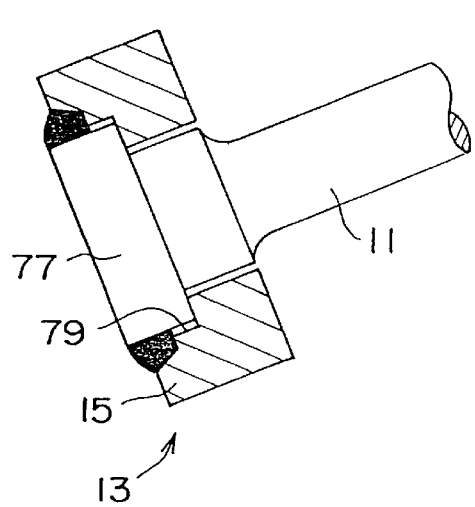
FIG. 14 is an explanatory view for illustrating the essential part of the roller bearing with a pin-type cage of FIG. 11.

FIG. 9 shows the essential part of a roller bearing with a stud-type cage according to a sixth embodiment of the present invention, seen from a longitudinally cut-away cross section thereof. The bearing 1 in this embodiment is also a single-row cylindrical roller bearing, in which cylindrical rollers 7 each having circular recesses 49 at the both ends thereof are provided between an inner race 3 and an outer race 5. Each of the cylindrical rollers 7 is retained to be rotatable by a stud-type cage 53 provided with studs 51 which are fitted with play in the respective circular recesses 49 and stud sections 65, while maintaining a predetermined space with an adjacent cylindrical roller 7.

The stud-type cage 53 is comprised of stay-type pins 55 which are fitted with play in through holes 9 each formed at the axial center of the cylindrical roller 7 and nuts 19, in addition to first and second annular side plates 15 and 17. In the present embodiment, three stay-type pins 55 are provided at equal intervals in the stud-type cage 53. In an area other than that, that is, in an area where no stay-type pin is provided, studs 51 which are similar to those of the fifth embodiment are provided to protrude from the inner side surfaces of the first and second annular side plates 15 and 17. The stay-type pin 55 is formed with first and second parallel screw portions 21 and 23 at the both ends of a shank section 57. However, the outer diameter of the second parallel screw portion 23 is substantially set to be smaller than the outer diameter of the shank section 57, thereby forming a shoulder portion 27a. No flange portion is formed on the inner side of the second parallel screw portion 23, while a stud section 65 in the form of a cylinder is formed on the inner side of the first parallel screw portion 21.

In the positions where the stay-type pins 55 are provided, the first annular side plate 15 is provided on the inner side surface thereof with first circular recesses 43 in which the stud sections 65 of the stay-type pins 55 are fitted, and with first screw holes 41 which are threadably engaged with the first parallel screw portions 21 concentrically with the first circular recesses 43. Also, the second annular side plate 17 is provided with parallel hole portions 59 through which the second parallel screw portions 23 of the stay-type pins 55 are passed at the axial centers of the studs 51 and with the second circular recesses 47 in which the shank sections 57 are fitted concentrically with the parallel hole portions 59.

Description will be made on assembling steps of the bearing in the sixth embodiment.

In order to assemble the bearing 1 in the sixth embodiment, the assembling worker first sets the outer race 5 in an unrepresented jig, and then mounts the cylindrical rollers 7 at the respective positions substantially predetermined in the outer race. Next, the assembling worker rotates the stud section 65 of the stay-type pin 55 by means of a wrench or the like to thereby screw the first parallel screw portion 21 of the stay-type pin 55 into the first screw hole 41 with a predetermined torque in such a manner that the stud section 65 is brought into tight contact with the bottom surface of the first circular recess 43. In this manner, the first annular side plate 15 with the stay-type pins 55 fixed thereto is assembled with the rollers which have been already provided in the outer race 5, so that the circular recesses 45 are fitted on the studs 51 in an area other than the positions where the stay-type pins 55 are provided. In the positions where the stay-type pins 55 are provided, the stay-type pins 55 are inserted and assembled in the corresponding through holes 9 of the rollers 7. Next, the assembling worker assembles the second annular side plate 17 at the position where the circular recesses 49 of the cylindrical rollers 7 are fitted on the stud 51 in an area other than the positions of the stay-type pins 55 and, at the same time, the second parallel screw portion 23 of each stay-type pin 55 passes the parallel hole section 59. Next, the assembling worker screws the nuts 19 into the respective second parallel screw portions 23 with a predetermined fastening torque by means of a pin wrench, and brings the shoulder portions 27a into tight contact with the second annular side plate 17, thereby completing assembling of the cylindrical rollers 7 and the stud-type cage 53. After that, the assembling worker welds the nuts 19 to the second annular side plate 17, thereby stopping the loosening thereof.

It should be noted that the operation and effects of the bearing 1 of the sixth embodiment are the same as those in the fifth embodiment, the description thereof will be omitted.

Though the specific embodiments of the present invention are as described above, the present invention is not limited to these embodiments. For example, in each of the foregoing embodiments, the present invention is applied to a single-row or double-row cylindrical roller bearing. However, the invention is applicable to any form of roller bearings such as a conical roller bearing, an automatic center-control roller bearing, etc. Also, the number of pin-type stays is three in the fifth and sixth embodiments. However, it is possible to provide four or more stays, or provide the stays for all cylindrical rollers. Further, a specific form of the pin or the annular side plate, or the like, is not limited to those described in the foregoing embodiments, but can be properly varied according to the design of the apparatus.

As clearly seen from the above description, according to the present invention, there is provided a roller bearing with a cage which has a pair of annular side plates provided at the both ends of rollers, and a plurality of pins with the both ends respectively connected to pin connection portions of the pair of annular side plates in order to separate these annular side plates from each other with a predetermined space therebetween. Parallel screw portions are respectively provided at the both ends of each of the above pins, and large-diameter portions each having a larger diameter than the parallel screw portions are respectively formed on the inner sides of the both parallel screw portions, and the pair of annular side plates are respectively provided with circular recesses in which the large-diameter portions are fitted on the inner sides of the pin connection portions, so that a space between the two annular side plates is determined by the positions of the large-diameter portions in the pins and the depth of the recesses in the annular side plates. As a result, the constant and appropriate value can be obtained only by maintaining the dimensional precision of these parts. Since the ends of the pin and the two annular side plates are both fastened by parallel screws, it is possible to conduct a hardening treatment of the pins without considering a crack or the like which may be caused by a weld. Further, the large-diameter portions are positioned on the inner sides of the parallel screw portions, so that the length of action of the load to be applied on the pins is shortened. As a result, the pins are hardly broken or damaged.

What is claimed is:

1. A roller bearing with a cage comprising:

an inner race and an outer race concentric with each other;

a plurality of rollers interposed between said inner race and said outer race; and a cage for retaining these rollers, characterized in that:

said cage comprises a pair of annular side plates disposed at the both ends of each of said rollers for supporting said rollers to be rotatable, and a plurality of pins each having its both ends respectively connected to connection portions of said pair of annular side plates;

parallel screw portions are respectively formed at the both ends of each of said pins and large-diameter portions each having a larger diameter than the parallel screw portions are respectively formed on the inner sides of said parallel screw portions on the both sides thereof; and circular recesses in which said large-diameter portions are respectively fitted are respectively formed on the inner sides of said pin connection portions of said pair of annular side plates.

2. A roller bearing with a cage according to claim 1, wherein said pins are fitted in through holes formed at the axial centers of said rollers to be relatively rotatable.

3. A roller bearing with a cage according to claim 1, wherein each of said pins is disposed between two adjacent rollers.

* * * * *